(12) United States Patent
Pelrine et al.

(10) Patent No.: US 7,977,923 B2
(45) Date of Patent: Jul. 12, 2011

(54) CIRCUITS FOR ELECTROACTIVE POLYMER GENERATORS

(75) Inventors: Ronald E. Pelrine, Longmont, CO (US); Roy D. Kornbluh, Palo Alto, CA (US); Joseph S. Eckerle, Redwood City, CA (US); Harsha Prahlad, Cupertino, CA (US)

(73) Assignee: SRI International, Menlo Park, CA (US)

( * ) Notice: Subject to any disclaimer, the term of this patent is extended or adjusted under 35 U.S.C. 154(b) by 710 days.

(21) Appl. No.: 12/043,776

(22) Filed: Mar. 6, 2008

(65) Prior Publication Data

US 2008/0218132 A1   Sep. 11, 2008

Related U.S. Application Data

(60) Provisional application No. 60/894,014, filed on Mar. 9, 2007, provisional application No. 60/894,785, filed on Mar. 14, 2007.

(51) Int. Cl.
*H01M 10/46* (2006.01)
(52) U.S. Cl. ....................................................... 320/166
(58) Field of Classification Search ................... 320/166, 320/167; 310/311, 314, 316.03, 323.01; 318/116
See application file for complete search history.

(56) References Cited

U.S. PATENT DOCUMENTS

| | | | |
|---|---|---|---|
| 6,157,113 A | 12/2000 | Hunter et al. | |
| 6,545,384 B1* | 4/2003 | Pelrine et al. | 310/309 |
| 6,628,040 B2 | 9/2003 | Pelrine et al. | |
| 6,768,246 B2 | 7/2004 | Pelrine et al. | |
| 7,034,432 B1 | 4/2006 | Pelrine et al. | |
| 7,368,862 B2 | 5/2008 | Pelrine et al. | |
| 2001/0035723 A1 | 11/2001 | Pelrine et al. | |
| 2003/0141787 A1* | 7/2003 | Pelrine et al. | 310/365 |
| 2006/0113878 A1 | 6/2006 | Pei et al. | |
| 2007/0257490 A1 | 11/2007 | Kornbluh et al. | |

OTHER PUBLICATIONS

International Search Report dated Jul. 25, 2008 in PCT Application No. PCT/US08/56311.
Written Opinion dated Jul. 25, 2008 in PCT Application No. PCT/US08/56311.

* cited by examiner

*Primary Examiner* — Edward Tso
(74) *Attorney, Agent, or Firm* — Beyer Law Group LLP

(57) ABSTRACT

Described herein is a generator with an electroactive polymer transducer. The transducer has a capacitance that varies with deflection of a polymer included in the transducer. The generator also includes a generator circuit, coupled to the electroactive polymer transducer, that includes a capacitor. The generator circuit is configured such that the capacitor collects electrical energy from the electroactive polymer transducer in response to a change in capacitance of the polymer.

28 Claims, 9 Drawing Sheets

CIRCUITS FOR ELECTROACTIVE POLYMER GENERATORS

CROSS-REFERENCE TO RELATED APPLICATIONS

This application claims priority under 35 U.S.C. §119(e) to i) U.S. Provisional Patent Application No. 60/894,014 filed on Mar. 9, 2007 and ii) U.S. Provisional Patent Application No. 60/894,785 filed on Mar. 14, 2007; each of these patent applications is incorporated by reference herein for all purposes.

FIELD OF THE INVENTION

The present invention relates to circuits and electroactive polymers. In particular, the invention relates to generator circuits used with an electroactive polymer transducer to harvest electrical energy from the electroactive polymer.

BACKGROUND

Electroactive polymer transducers include a layer of electroactive material sandwiched between top and bottom electrodes. A transducer may be used as an actuator, sensor, or generator. In generation mode, an electroactive polymer receives mechanical energy and outputs electrical energy.

Compliant electroactive polymers are still young in their technology evolution relative to piezoelectric and other mature rigid electromechanical conversion materials. Electrically and mechanically, the compliant electroactive polymers behave very differently than their rigid predecessors. The polymers deflect much more. This allows them to receive more mechanical energy for the same force, and correspondingly generate more electrical energy. Compliant electroactive polymers also include electrical properties that are very different from rigid piezoelectric devices. For example, rigid piezoelectric devices largely use metal electrodes, while the compliant polymers use compliant electrodes such as those based on carbon greases. The compliant electrodes typically use materials such as carbon with far greater electrical resistances than metals, which changes electrical performance. Generation circuits designed for the piezoelectric materials do not work efficiently for the newer compliant electroactive polymers. Efficient generator circuits for compliant electroactive polymers are needed.

SUMMARY

In one aspect, the present invention relates to a generator with an electroactive polymer transducer. The transducer includes an electroactive polymer, a first electrode in electrical communication with a first surface portion of the electroactive polymer and a second electrode in electrical communication with a second surface portion of the electroactive polymer. The transducer has a capacitance that varies with deflection of the electroactive polymer. The generator also includes a generator circuit with a capacitor, where the circuit is electrically coupled to the electroactive polymer transducer. The generator circuit is configured such that the capacitor collects electrical energy from the electroactive polymer transducer in response to a change in capacitance of the electroactive polymer.

In another aspect, the invention relates to an apparatus. The apparatus includes an electroactive polymer transducer with a capacitance that varies with deflection of an electroactive polymer included in the transducer. The apparatus also includes a generator circuit including a capacitor, where the circuit is electrically coupled to the electroactive polymer transducer. The apparatus also includes one or more transmission mechanisms that are designed or configured to receive mechanical energy and to transfer a portion of mechanical energy to the electroactive polymer transducer. The transferred portion of the mechanical energy results in a deflection in a portion of the electroactive polymer transducer.

In yet another aspect, the invention relates to a method of converting mechanical energy to electrical energy using an electroactive polymer transducer including an electroactive polymer and two electrodes. The method includes mechanically deflecting a portion of the electroactive polymer such that the portion has a larger area between the two electrodes than an area for the portion between the electrodes before the deflection. The method also includes applying a voltage difference between the two electrodes, wherein the voltage difference is not large enough to cause the portion to mechanically deflect from the larger area. The method further includes mechanically contracting the electroactive polymer transducer to have a smaller area between the two electrodes than the larger area between the electrodes when the voltage difference was applied. The method additionally includes removing electrical energy from the electroactive polymer transducer using a generator circuit that includes a capacitor.

These and other features of the present invention will be described in the following description of the invention and associated figures.

DETAILED DESCRIPTION OF THE PREFERRED EMBODIMENTS

The present invention is described in detail with reference to several embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
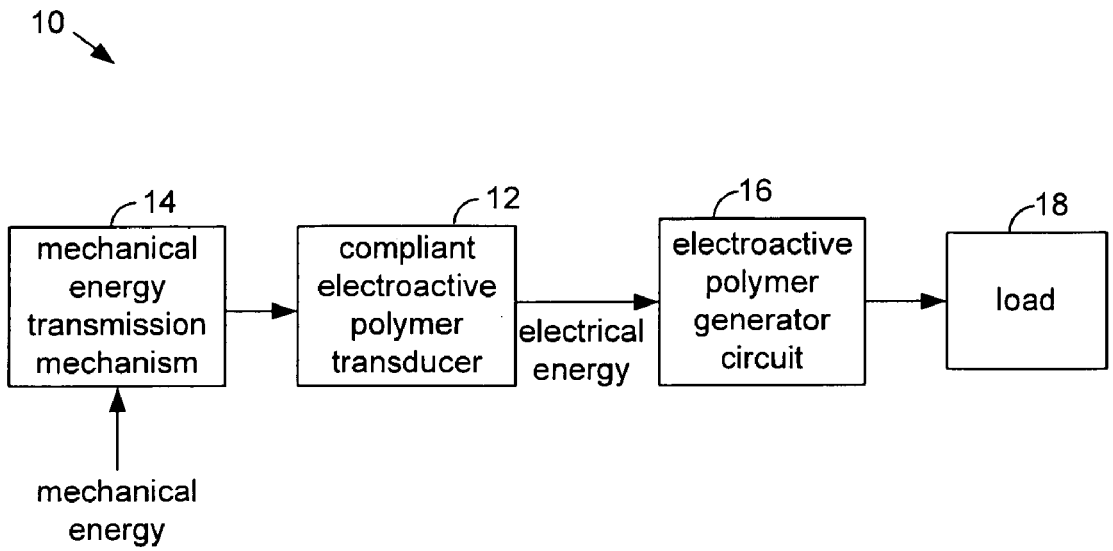
FIG. 1 illustrates a high level diagram of a mechanically powered generator system in accordance with one embodiment.

FIG. 1 illustrates a block diagram of a mechanically powered generator apparatus 10 in accordance with one embodiment. The apparatus 10 includes an electroactive polymer transducer 12, mechanical energy coupling mechanism 14, electroactive polymer power generator circuit 16, and an optional load 18.

A mechanical energy source provides energy for conversion to electrical energy. In one embodiment, the mechanical energy relates to a moving mass and includes its kinetic energy. Apparatus 10 may then use one or more transmission coupling mechanisms 14 to convert the kinetic energy to a motion suitable for input to electroactive polymer transducer 12. The mechanical energy source may include cyclic or non-cyclic motion. A moving mass may include a biological mass, an environmental source, and/or a conventional device or apparatus such as a combustion engine, for example. For biological applications, the mechanical energy can be derived from a person walking or jogging for example. Alternatively, the mechanical energy can be provided from ocean waves or the wind. These types of mechanical energy sources include large motions with low cycling frequencies. Although a few examples of mechanical energy sources have been provided, these in no way should be construed as limiting the present invention. Other mechanical energy sources are suitable for input. Some other suitable examples of mechanical energy input are described in commonly owned U.S. Pat. No. 6,768,246, which is incorporated by reference in its entirety for all purposes.

The one or more mechanical energy transmission mechanisms 14 transfer a portion of an external mechanical energy source to mechanical energy suitable for deflecting an electroactive polymer transducer. Typically, the transmission results in linear or planar deflection of the polymer. Other suitable electroactive polymer deflections are described below with respect to FIGS. 10A and 10B, and the transmission mechanisms 14 may be any such devices to output such deflections. This may include transmission from a path of a moving mass to linear deflection of an electroactive polymer transducer 12. Transmission mechanism 14 may include the use of gears, clutches, rotary to linear translators such as worm gears, etc. Other mechanical energy sources are suitable for input. Some other examples of mechanical energy transmission mechanisms are described in U.S. Pat. No. 6,768,246. One of skill in the art is aware of a vast array of mechanical energy transmission mechanisms suitable for use herein.

Electroactive polymer transducer 12 is configured to receive mechanical energy and configured to output electrical energy. In one embodiment, the electroactive polymer in transducer 12 is compliant. Compliant electroactive polymers have an elastic modulus less than about 100 MPa, and in some cases in the range 0.1 to 10 MPa. Compliant polymers having a maximum actuation pressure, defined as the change in force within a polymer per unit cross-sectional area between actuated (field applied) and unactuated (field removed or greatly reduced from actuated condition) states, between about 0.05 MPa and about 10 MPa, and particularly between about 0.3 MPa and about 3 MPa are useful for many applications. Compliant electroactive polymers, electrodes and transducers will be described in further detail below with respect to FIGS. 10A and 10B.

Electroactive polymer power generator circuit 16 collects electrical energy produced by transducer 12. The circuit 16 may also store electrical energy and/or transfer portions of the harvested energy to a load 18. In one embodiment, circuit 16 includes a capacitively coupled power generator circuit 16 that is coupled to the transducer 12.

During energy conversion, mechanical energy is applied to the transducer 12. In response, the transducer 12 converts the mechanical energy into electrical energy, which is then collected (and optionally stored) in the power generator circuit 16.

The power harvested by generator circuit 16 may then used to power a load 18. Load 18 may include any electrical energy consumption device, such as cell phone, PDA, music player, a light, or just about any other type of device that requires electrical energy to operate. In another embodiment, system 10 is used in electrical energy generation applications where the energy is supplied onto a grid for downstream consumption.

The electroactive polymer transducer 12 converts mechanical energy to electrical energy. In a generator mode, a small bias voltage is applied between the electrodes of transducer 12 while the polymer is stretched (see FIG. 10B). The small voltage is insufficient to cause further deflection. While the bias is applied to the two electrodes, mechanical energy is used to deflect the polymer from a stretched state to a contracted state (see FIG. 10A). Typically, the energy to contract is from the polymer's elastic stored energy in the stretched state. As the electroactive polymer deflects to the contracted state, capacitance of the transducer 12 increases. Thus, in generator mode, contracting mechanical energy input is greater than an electrical energy applied to the electrodes, resulting in planar contraction, separation of the electrodes and a net gain in the electrical output of the system. More detailed description of electroactive polymer energy conversion is provided below with respect to FIGS. 10A and 10B.

Circuit 16 draws energy from the electroactive polymer transducer 12 as the polymer contracts. Circuits described herein rely on the varying capacitance C of the electroactive polymer. In general, when stretched, the polymer transducer 12 has a high degree of capacitance, and when contracted, a low degree of capacitance. The instantaneous capacitance C (in the SI system of units) at any given moment of the transducer is calculated from the equation (1) below:

$$C = \frac{\mathcal{E}\mathcal{E}_o A}{t}; \quad (1)$$

where $\mathcal{E}$ is the dielectric constant of the elastomer material;
$\mathcal{E}_o$ is the permittivity constant in free space;
A is the surface area of the elastomer; and
t is the thickness of the elastomer.

Based on equation (1), it is apparent that the capacitance of the transducer 12 (i) increases when the elastomer is in the stretched state as the surface area (A) increases while the thickness (t) decreases; and alternatively (ii) decreases in the contracted state because the area (A) decreases while the thickness (t) increases.

The charge Q on the positive electrode can be calculated from equation (2) below:

$$Q=CV \qquad (2);$$

where C is the capacitance as calculated in equation (1); and

V is the voltage difference between the positive and negative (or ground) electrodes.

Finally, the stored electrical energy U of the capacitor is defined by the equation (3) below:

$$U=\tfrac{1}{2}Q^2/C \qquad (3)$$

where Q is the charge on the positive electrode; and

C is the capacitance of the elastomer dielectric.

Figure 2A:
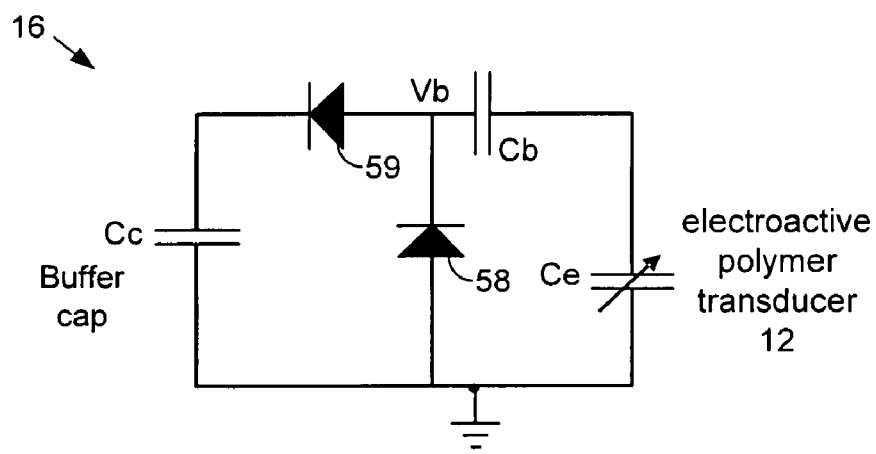
FIG. 2A illustrates a block diagram of a capacitively coupled power generator circuit in accordance with another embodiment.

FIG. 2A illustrates a block diagram of a capacitively coupled power generator circuit 16 in accordance with another embodiment. A capacitively coupled power generator circuit refers to a circuit that collects or receives electrical energy from an electroactive polymer transducer 12 by first storing the electrical energy in one or more capacitors. The electrical energy in the capacitor(s) may then be withdrawn and used or stored, as desired.

Circuit 16 in FIG. 2A shows power collection from transducer 12 using drainage charge off capacitor, Cc. This occurs in a three-step method: a) initial charging with an initial or small voltage, b) electrical changes when the electroactive polymer transducer 12 deflects from a contracted state to a stretched state, and c) electrical changes when the transducer 12 deflects from a stretched state to a contracted state. Again, the initial or small voltage is insufficient to cause deflection on its own.

Polymer deflection from a contracted state to a stretched state lowers the polymer voltage until either: a) the electroactive polymer transducer 12 is fully stretched but Vb>0 and no charge flows in this case; or b) Vb reaches Vb=0 and charge is pulled up from ground through diode 58. If Vb never reaches ground (condition a) then no charge flows and Vb drops in voltage the same amount as the electroactive polymer voltage.

During polymer deflection from a stretched state to a contracted state, the main condition again is whether current flows from Cb to Cc. In this case, the charge flows from Cb to Cc rather than from ground. Charge will flow from Cb to Cc if Vb increases from its previous level to Vc (diode 59 then becomes forward biased). No charge flows until this point is reached, so Va and Vb rise from the electroactive polymer transducer 12 contraction with charge thereon. It is helpful to view Circuit 16 in FIG. 2A over an entire typical cycle of stretching and contracting of electroactive polymer transducer 12. Assuming some small charge is on transducer 12 initially, stretching lowers its voltage and pulls charge up from ground through diode 58 to allow charge to flow from the high side of Cb (connected to transducer 12) onto transducer 12. Thus, during stretching, charge flows from Cb to Ce. When transducer 12 contracts, voltage on Ce increases and eventually causes charge to flow onto Cb and through diode 59 onto Cc. Essentially, transducer 12 pumps charge up from ground to a high voltage on Cc where it can be drawn off and used for an electrical load (not shown in FIG. 2A).

Figure 2B:
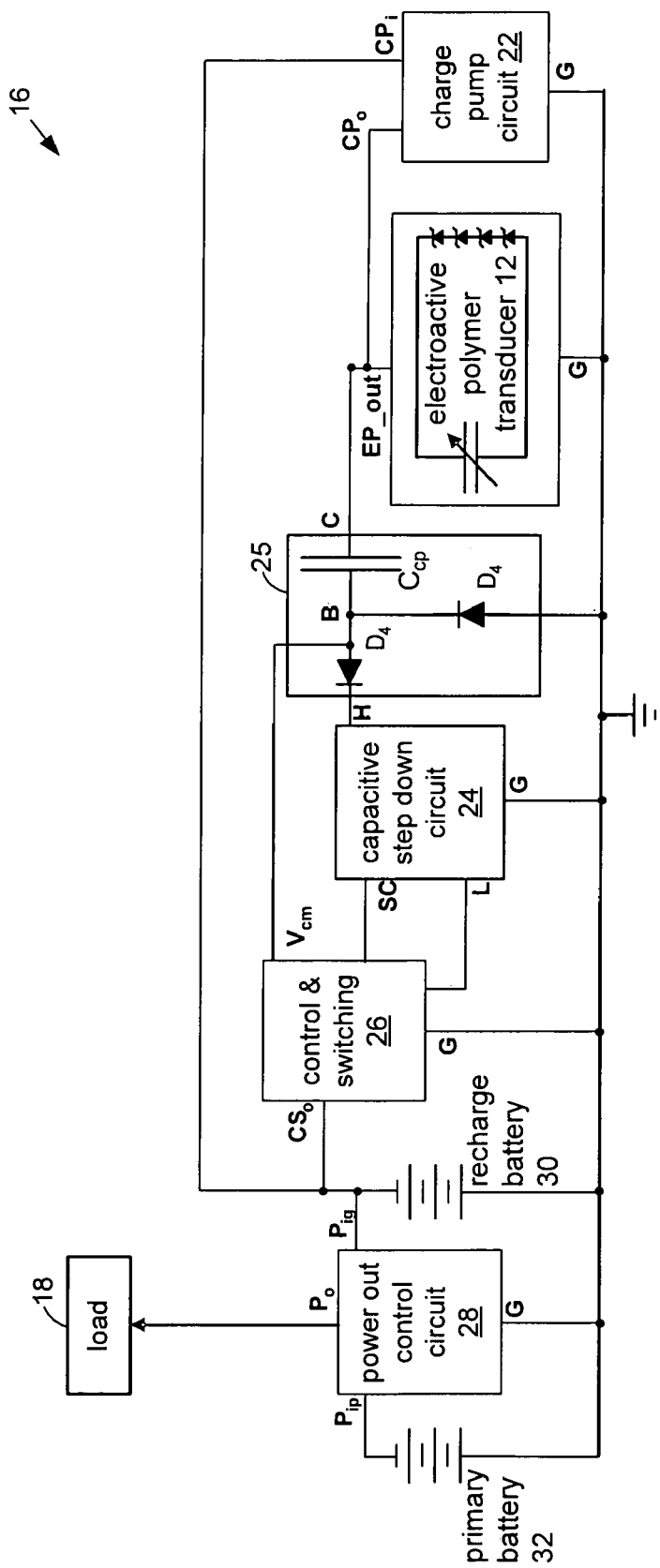
FIG. 2B illustrates a block diagram of a power generator circuit capacitively coupled to an electroactive polymer transducer in accordance with another embodiment.

FIG. 2B shows a block diagram of an electroactive polymer generator circuit 16 in accordance with one embodiment of the present invention. The generator circuit 16 includes a charge pump circuit 22, a capacitor step down circuit 24, a second charge pump circuit 25, control & switching circuit 26, a power output control circuit 28, a rechargeable battery 30 and a primary battery 32.

In this embodiment, the electroactive polymer transducer 12 is connected between the two charge pumps 22 and 25. The load 18 is coupled to the power output control circuit 28. Each of the circuits 12, 22, 24, 25, 26 and 28 are coupled to the ground terminals (G) of the rechargeable and primary batteries 30, 32 respectively.

During electrical energy generation, the charge pump 22 initially generates its own charge, and a charge on transducer 12, from an initial charge from the rechargeable battery 26 at node CPi. Charge pump 22 is connected to transducer 12 via CPo. The varying capacitance of transducer 12 operates in conjunction with charge pump 22 via line CPo to provide a high voltage bias to the transducer 12. The actual voltage provided depends on a number of factors such as the number of cycles from start-up, the initial battery voltage, how much energy is taken off transducer 12, the amplitude of the capacitance swings, any voltage limiting devices, and so forth. Typically, in response to the time-varying changes in transducer 12 capacitance, the transducer 12 and the charge pump 22 cooperate together to provide a high voltage (i.e., 1000 to 4000 volts, but other voltages are suitable for use) to the capacitor step down circuit 24. Many compliant electroactive polymers operate at high voltages, depending on polymer material and film thickness. Correspondingly, the function of the capacitor step down circuit 24 is to reduce the polymer output voltage to a level that can be used to efficiently recharge the battery 30, under the control of control switching circuit 26.

The power out control circuit 28 determines if either the rechargeable battery 30 or the primary battery 32 should be used to power the load 18. If the rechargeable battery 30 is sufficiently charged, then it is used. Otherwise the primary battery 32 is used. In some applications the primary battery is not needed, but it is shown here as a representative example of what might be added to the generator circuit 16 for some applications.

Figure 3:
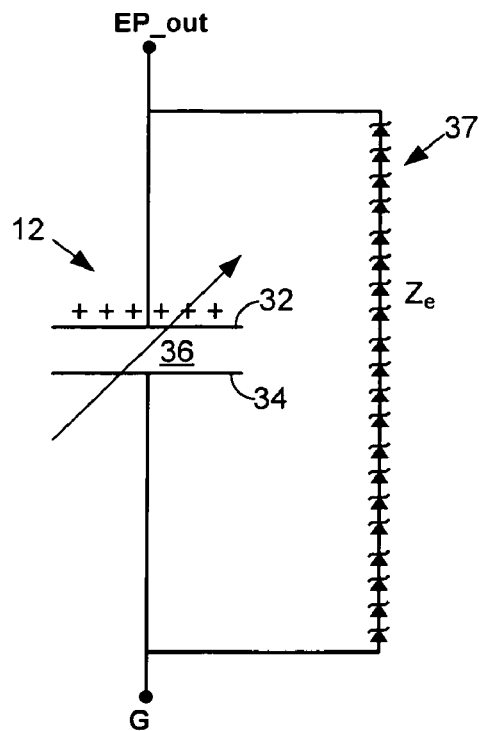
FIG. 3 shows an over-voltage circuit suitable for use with an electroactive polymer in accordance with specific embodiment.

FIG. 3 shows a circuit diagram of the transducer 12 and protection circuit in accordance with a specific embodiment of the present invention. The electroactive polymer transducer 12 includes a positive electrode (or terminal) 32, a negative electrode (or terminal) 34, and an electroactive polymer 36. The positive terminal 32 is connected to node EP_out. The negative terminal is connected to ground (G).

In this case, transducer 12 couples to a voltage protection circuit 37 including a set of zener diodes, Ze. A chain of zener diodes 38 are coupled between the EP_out node and ground, in parallel to transducer 12. As previously noted, the purpose of the transducer 12 is to create a variable capacitance and variable voltage at the node EP_out in response to the mechanical energy input. In the event the output voltage becomes excessively large and exceeds a predetermined threshold, then the zener diodes 38 in the voltage protection circuit allow current to flow relatively freely from the EP_out node to ground and thus limiting the maximum voltage that EP_out can reach. In this manner, the transducer 12 is protected from over-voltage conditions. In one embodiment, the voltage protection circuit 37 allows a maximum voltage of about 1 kV to 10 kV. In a specific embodiment, the voltage protection circuit 37 allows a maximum voltage of about 3 kV to 6 kV. Anywhere from 1 to about 40 zeners may be used for this purpose. Other types of voltage protection components such as breakover diodes may also be used instead of zener diodes. One significant parameter for this voltage protection circuit is that the leakage current be low enough that the power loss below the voltage limit is a negligible loss for the generator circuit. Leakage currents for zener diodes used in specific embodiments range from 0.5 to 1.0 micro amps.

Figure 4:
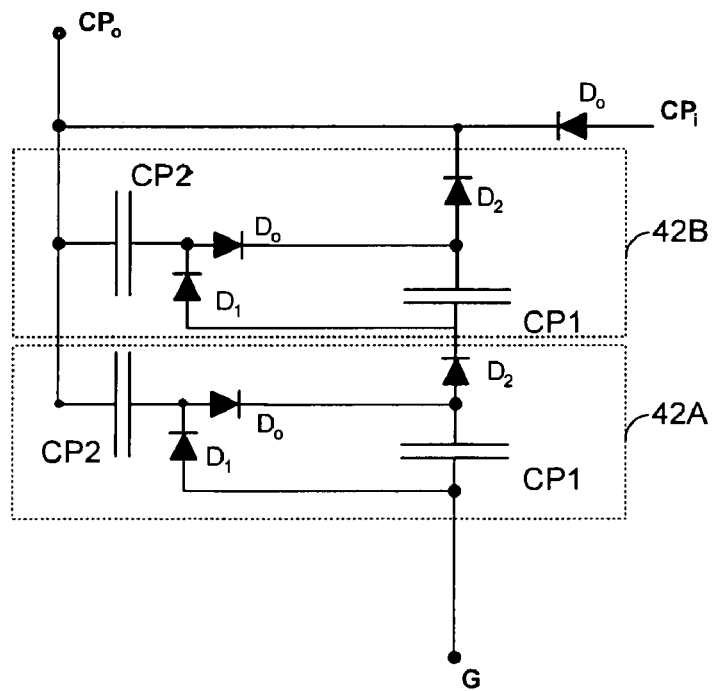
FIG. 4 illustrates a modular charge pump circuit used in the power generator circuit in accordance with one specific embodiment.

FIG. 4 illustrates a modular charge pump circuit 22 suitable for use with circuit 16. The charge pump circuit 22 inputs low battery voltage and, using electroactive polymer voltage oscillations, pumps the electroactive polymer up to high voltage. In the embodiment shown, the charge pump circuit 22 includes a plurality of cascaded stages 42A and 42B, each configured to incrementally increase the voltage of the transducer 12. Both 42A and 42B each include two capacitors CP1 and CP2 and three diodes D0, D1 and D2. Capacitors CP2 of both stages have one terminal coupled to the output of the transducer 12 at node EP_Out and CPi, which is connected through diode D0 to the positive terminal of rechargeable battery 30 (typically 12 to 48 volts). The diode D0 connected to CPi prevents current from flowing back into battery 30 as the voltage at CPo rises above battery voltage. The battery 30 only need supply a very small initial charge to the capacitors in the charge pump circuit 22 and transducer 12, and after that the action of the transducer 12 with charge pump circuit 22 serves to supply power. In specific embodiments battery 30 can even be disconnected from CPi during operation of the generator after an initial charge has been supplied, but may need to be reconnected if the generator sits idle for long periods of inactivity of transducer 12. In other embodiments battery 30 is more conveniently permanently connected to CPi and diode D0 prevents backflow of current, yet allows initial charging when needed. The capacitors CP1 of both stages are coupled in series between node CPi and ground G. Diodes D0 and D1 are coupled between the second terminal of capacitor CP2 and the first and second terminals of capacitor CP1 of each stage 42A and 42B respectively. The diodes D2 are coupled in series with the capacitors CP1 of each stage between node CPi and ground. It should be noted that for the sake of simplicity, only two stages 42A and 42B are illustrated. In various embodiments, a charge pump circuit 22 including additional stages 42, or only one stage 42, may be used.

When the power generator circuit 16 initializes, a charge (such as 12 to 48 volts from the rechargeable battery 30 is applied to the first terminal of capacitor CP2 through node CPi of stage 42A, causing the capacitor CP2 to charge up to the battery voltage. When the variable capacitance of transducer 12 decreases and the voltage at node EP_Out increases, charge dumps onto the same terminal of the capacitor CP2 of stage 42A, causing diode D0 to turn on and capacitor CP1 to charge up. When the transducer 12 increases capacitance and the voltage at node EP_Out and CPo drops, the voltage on capacitor CP2 decreases. Eventually the voltage decreases to the point where the low side of CP2 (the side opposite CPo connected to diode D1 and D0) reaches ground. As the voltage on CPo drops further, diode D1 turns on, causing current to flow from ground to the low side of CP2. In other words, as the voltage CPo drops, the voltage on both terminals of CP2 drop a corresponding amount, keeping the voltage difference across the two terminals constant. But when the low side of CP2 reaches ground and diode D1 becomes forward biased (turns on), the low side cannot drop any further, and charge flows to allow the high side to continue to drop in voltage by reducing the voltage difference across the two terminals of CP2. When the transducer 12 increases in voltage again, more charge is dumped onto capacitor CP1 (it cannot return to ground because now diode D1 is reversed biased). The above-description is repeated with each expansion and contraction cycle of the transducer 12.

Explained another way, no charge flows from CP2 during electroactive polymer expansion (increase in capacitance and decrease in voltage) until the low side of CP2 reaches ground. Then and only then does charge flow from ground to the low side of CP2. In the contraction part of the cycle when electroactive polymer voltage increases (capacitance decreasing), no charge flows from CP2 until the high side voltage of CP1 is reached. Then and only then does charge flow from CP2 onto CP1. So for portions of the cycle, the electroactive polymer voltage is changing but no charge is flowing from CP2; it is just being raised or lowered in voltage as a whole (if the voltage drop across CP2 is measured during this portion, the voltage would be changing but the voltage drop across CP2 between it's two terminals would be constant).

The second stage 42B operates in the same manner as described above, except the reference voltage for capacitor CP1 of stage 42B is not ground. Instead the reference voltage for the capacitor CP1 of stage 42B is the charge on the same capacitor CP1 of the previous stage 42A. Any subsequent stages operate in a similar manner, using the charge of the capacitor CP1 of the previous stage as the reference voltage. By using multiple stages, the charge pump circuit 22 thus generates a high voltage bias for the transducer 12. In one embodiment, the bias voltage is between about 500 and about 2000 volts. Typically the bias voltage is less than the typical peak electroactive polymer voltage; rather, it more resembles the minimum electroactive polymer voltage during a cycle rather than the maximum.

Circuit 16 includes a second charge pump 25 that is configured to maintain a high voltage output of the electroactive polymer transducer 12. Referring again to FIG. 2B, the charge pump 25, which is provided between the transducer 12 and the step down circuit 24, includes capacitor Ccp and two diodes D4. When the transducer 12 is generating a high voltage, then the capacitor Ccp is charged up, providing a high voltage at node H at the input of the step down circuit 24. On the other hand when the transducer 12 is generating a reduced voltage (such as when transducer 12 is expanded), then the voltage on capacitor C and node B drops. If the voltage at node B drops slightly below zero, then charge is pulled from ground G though the ground-connected diode D4 and stored on the capacitor C. When the transducer 12 is again generating a high voltage, then the capacitor C charges up, providing a high voltage at node H at the input of the step down circuit 24. For cyclic mechanical input, the aforementioned cycle is repeated as the transducer 12 cycles through its stretched and compliant states. Typically the second charge pump 25 is distinguished from charge pump circuit 22 in that charge pump 25 is intended to provide the main power output of the generator, whereas charge pump circuit 22 only provides enough high voltage charge to keep the average voltage high in the presence of parasitic leakage losses. Thus, the capacitors in charge pump circuit 22 would typically have much lower values compared to capacitor Ccp in second charge pump 25, reflecting the fact that Ccp is intended for power coupling whereas charge pump circuit 22 would typically only need to provide a small average power to offset parasitic losses. In specific embodiments, portions of these two charge pumps can be combined, but in the embodiment shown in FIG. 2B the power coupling function (charge pump 25) is separate from the initializing and maintaining average charge and voltage function (charge pump circuit 22).

Figure 5:
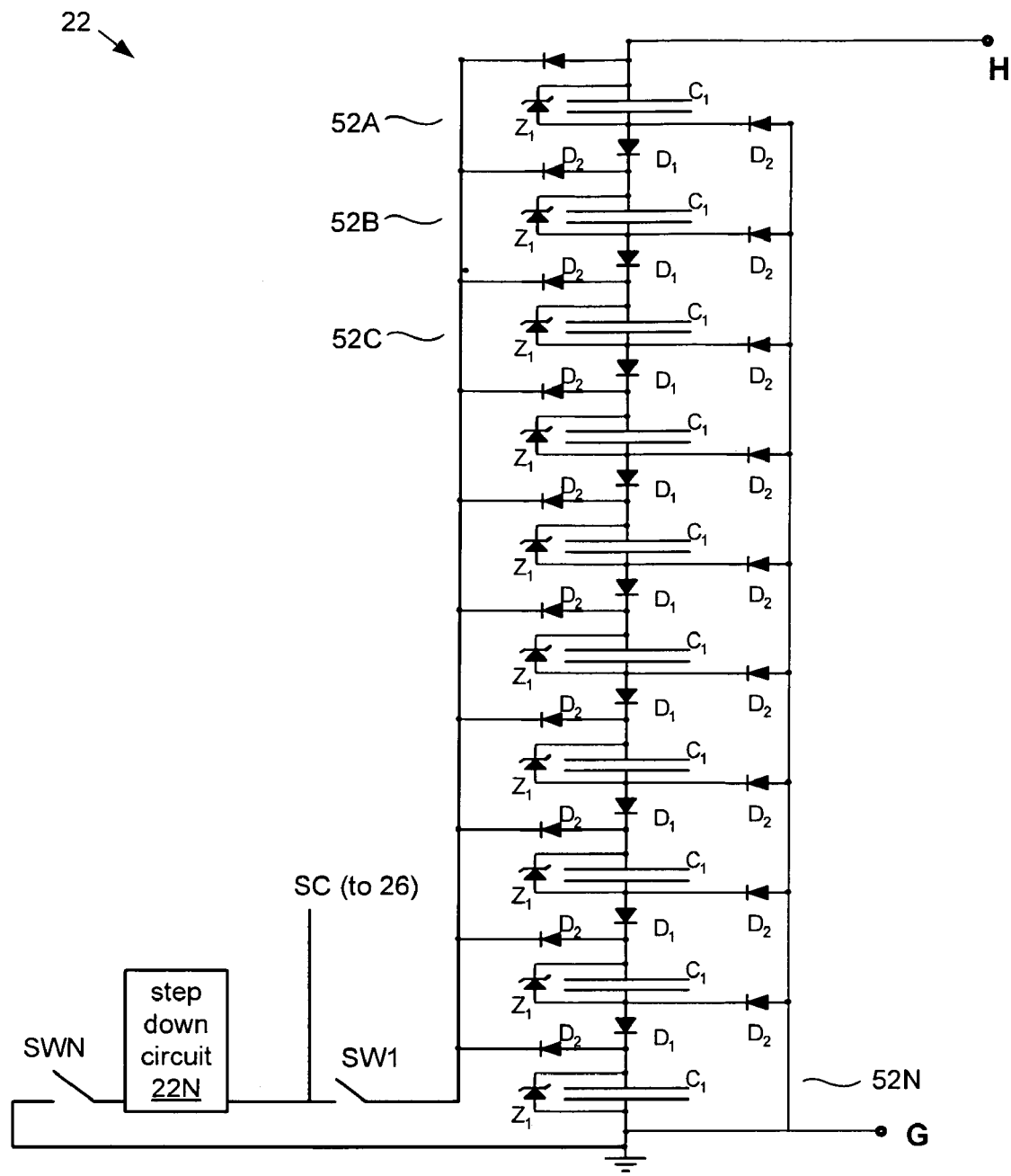
FIG. 5 shows a capacitor step-down circuit used in the power generator circuit in accordance with one specific embodiment.

FIG. 5 illustrates a circuit diagram of the capacitor step-down circuit 22 in accordance with a specific embodiment. The step-down circuit 22 is configured to reduce the relatively high voltage at node H from the transducer 12 to a voltage that is compatible with the rechargeable battery 30. For example, the step-down circuit may reduce an input voltage of 1000 to 4000 volts to 12 or 24 volts, depending on the voltage supply of battery 30.

As shown in FIG. 5, the step-down circuit 22 includes a plurality of stepped capacitance storage stages 52A through 52N coupled in series. Each stage includes a capacitor C1, a zener diode Z1 coupled between the terminals of the capacitor C1, a diode D1 coupled to the negative or bottom terminal of capacitor C1, a diode D2 is coupled to the positive or top terminal of Capacitor C1 and the output of diode D1, and a diode D3. Each stage 52A-52N has its positive terminal connected in parallel to the supply terminal of switch SW1 through diode D2 respectively. The diode D1 between each stage 52A-52N prevents current from flowing from ground to node H. Or, put another way, the capacitors 52A-52N can charge up through diodes D1 but they cannot discharge through this path. There is consequently a fixed drop in voltage across each stage 52. For example, if the voltage at the input node H is 1000 volts and there are ten stages 52, then there is a voltage drop of approximately 100 volts per stage 52 (for simplicity in description we are neglecting any forward voltage drop across diodes; typically these drops are small but in some cases must be considered in the design in more detail depending on their magnitude). The zener diodes Z1 provide protection against over-voltage conditions between the positive and negative plates of the capacitor C1 of each stage 52A-52N respectively, and can be omitted in some embodiments. Lastly, the diodes D3 are connected between the return terminal of switch SW1 and the negative terminal of capacitor C1 of each stage 52A-52N. When switch SW1 is closed, the diodes D3 thus provide a return path from a closed circuit between the capacitors C1 of each stage 52A-52N and the rechargeable battery 30. The diodes D3 also function to make each stage 52A-52N in series with one another. Without the diodes D3, and the return path is shorted instead at the locations of D3, the entire voltage at node H would drop to ground through the upper stage 52A.

In alternative embodiments, a plurality of the step-down circuits 22-22N may be cascaded together, with each cascaded stage providing a step-down in voltage. For example, if the first cascaded stage steps down a voltage from 1000 to 100 volts, then the second stage can be used to step down 100 volts to 10 volts. Each stage can also be coupled to the supply and return paths of a switch SW and used to charge one or more rechargeable batteries. Alternately, in other embodiments, a first stage such as that shown in FIG. 5 steps down the voltage to an intermediate level (for example, steps 1000 V down to 100V), then the output is fed into a different type of step down circuit known in the prior art, such as a buck circuit for further step down (in the mentioned example, the buck circuit might step down 100 V to 12 V). Such an arrangement can be advantageous because the step down circuit of FIG. 5 can lower the voltage to a range where conventional step down circuits may be more applicable, available, or lower cost.

Figure 6:
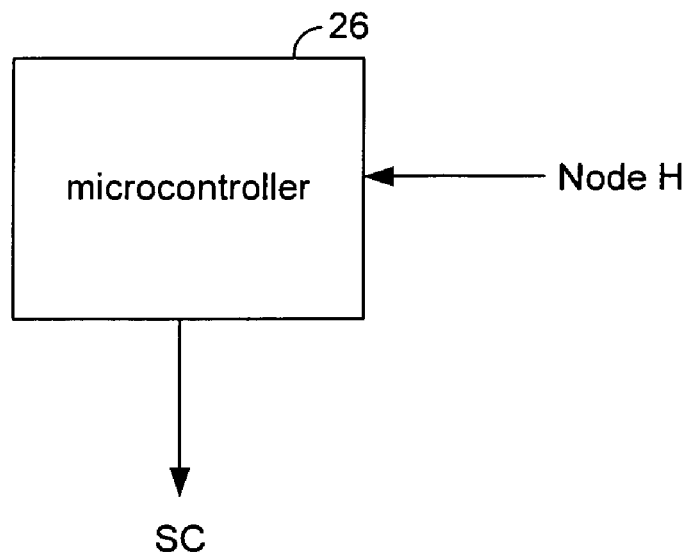
FIG. 6 illustrates a control switching circuit suitable for use with circuits described herein.

FIG. 6 illustrates a simplified control switching circuit 26 suitable for use with circuits described herein. Switching circuit 26 provides overall control of electrical energy generation and power flow. Circuit 26 monitors output high voltage, switches access to step down circuit 24, outputs power to charge generator batteries, etc. The control switching circuit 26 generates the signal SC, which is used to turn on/off the switch SW1. During operation, the control switching circuit 26 monitors the voltage at node H, at the input of the step-down circuit 22. When this voltage drops a specified amount below the desired output voltage of the step down circuit (such as 5 V below the battery voltage, for example), typically meaning the capacitors C1 of the stages 52A-52N are charged and energy is no longer flowing into the capacitor step down circuit 24 from charge pump 25, then the control switching circuit 26 asserts the signal SC. In response, the switch SW1 is closed, allowing the capacitive charge on the capacitors C1 of the stages 52A-52N to recharge the battery 30. When the voltage on node H is increasing or reaches a slightly higher "open" threshold above the "closed" threshold (for example, the threshold for closing the switch might be 5 V below battery voltage while the threshold for opening the switch could be 2 V below battery voltage), the switch SW1 is opened, disconnecting the battery from the step-down circuit 22. In one embodiment, the control switching circuit 26 is a microcontroller. In another embodiment the control switching circuit is a window comparator. Other controllers are suitable for use herein. A single chip micro processor (e.g. PIC-type single chip computer) is also suitable for use with control switching circuit 26.

Figure 7:
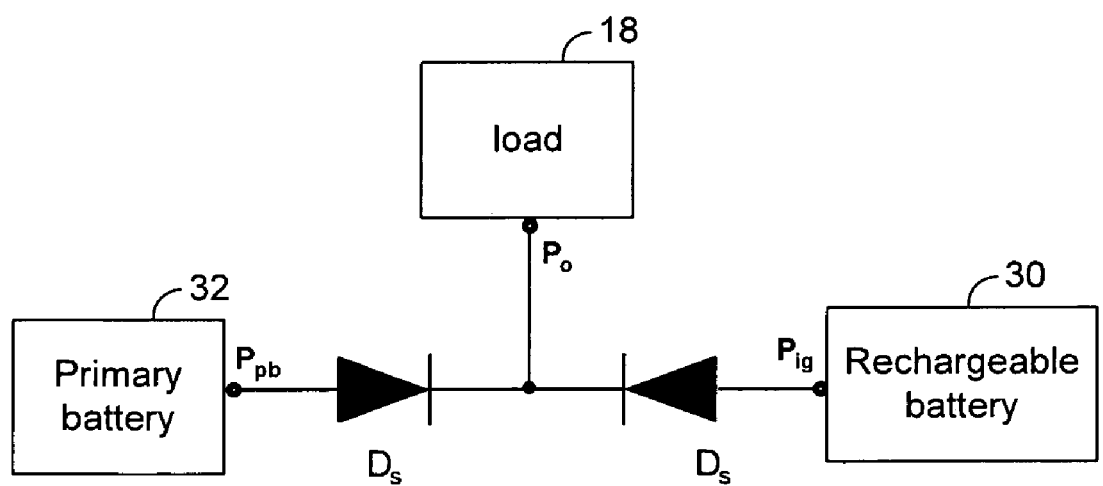
FIG. 7 is a power output control circuit used in the power generator circuit in accordance with specific embodiment.

FIG. 7 shows a power output control circuit 28 in accordance with a specific embodiment of power circuit 16. The power output circuit 28 includes a first diode D1 connected to the rechargeable battery 30 at node Pig and a second diode D2 coupled to the primary battery 32 at node Ppb. During operation, power is drawn from the highest voltage source and provided to the end device 18. Thus, when the source 14 is providing mechanical energy to the transducer 12, the rechargeable battery 30 can be designed to be the slightly higher voltage source. On the other hand when there is a lull in the mechanical energy provided to the transducer 12 and the rechargeable battery 30 is significantly drained, the primary battery 32 will likely be the higher voltage source. With this arrangement, the life of the primary battery source can be significantly extended. The primary battery is presented as a useful example for interfacing the generator to other circuits that provide or use power. In some cases the primary battery will be absent and energy is simply supplied by the rechargeable battery to the desired electrical load.

Figure 8:
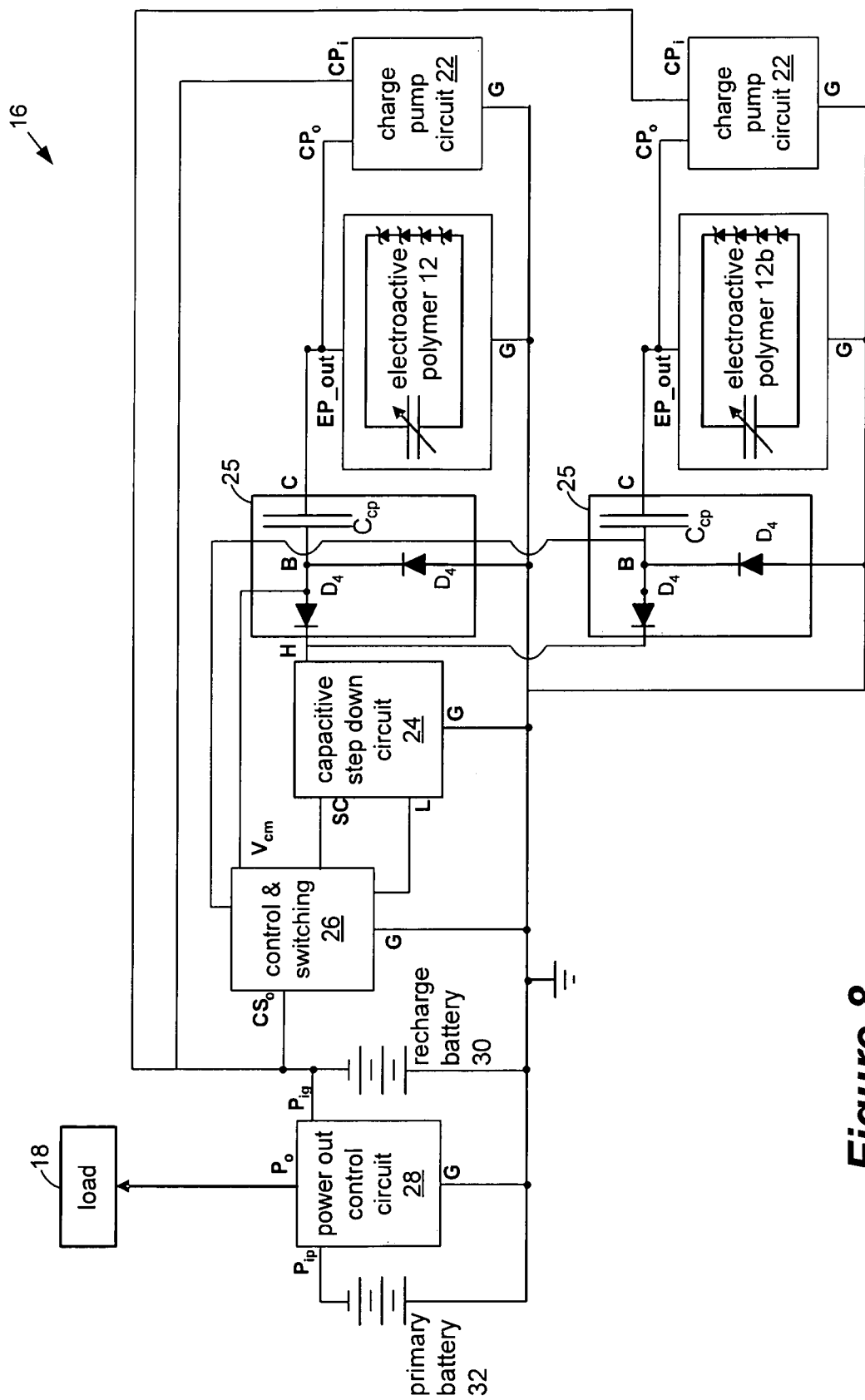
FIG. 8 shows a generator circuit in accordance with another specific embodiment where the circuit is configured to harvest electrical energy from a second electroactive polymer transducer.

While power circuit 16 has been described so far with respect to servicing a single electroactive polymer transducer, it can be readily adapted to service multiple transducers. FIG. 8 shows a generator circuit 16 in accordance with another specific embodiment where the circuit 16 is configured to harvest electrical energy from a second electroactive polymer transducer 12b. Additional transducers 12 can be added similarly. In general, circuit 16 can generate electrical energy as long as at least transducer is functional or receiving mechanical energy.

So far, circuit 16 embodiments have not explicitly mentioned the use of an inductor. In a specific embodiment, circuit 16 does not include an inductor.

Figure 9:
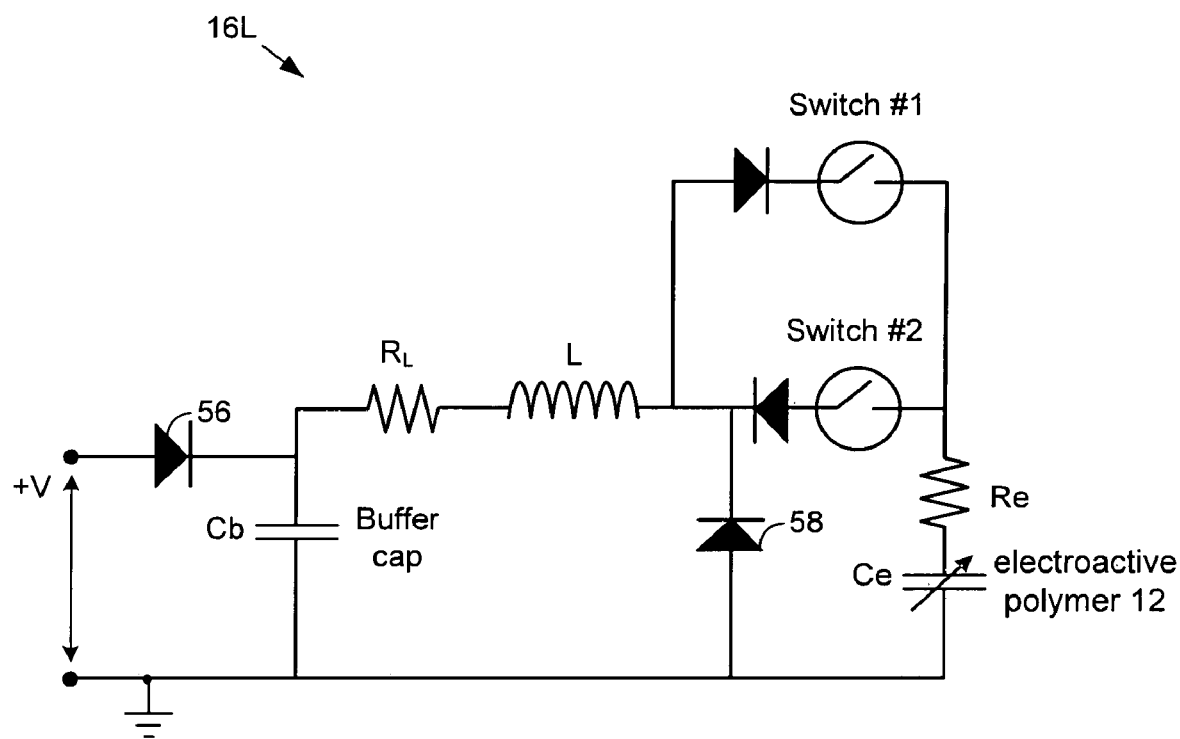
FIG. 9 illustrates an LRC circuit for harvesting energy using an electroactive polymer transducer in accordance with another embodiment of the present invention.

In another embodiment, circuits described herein employ inductance and capacitance combinations that are tuned in performance to electroactive polymer transducer 12 usage. FIG. 9 illustrates an LRC power generator circuit 16L for harvesting energy using an electroactive polymer transducer in accordance with another embodiment of the present invention. LRC circuit 16L both pumps the electroactive polymer 12 to a bias voltage and collects electrical energy from the electroactive polymer 12.

The circuit 16L is initially charged at low voltage from a battery 30 or 32 or other low voltage source (indicated by +V in FIG. 9). This initially charges capacitor buffer capacitor, Cb. In a specific embodiment, Switch #1 is also closed during initial charging with the electroactive polymer 12 in a stretched or higher capacitance state. However, in many cases this is not necessary, particularly if Cb is much greater than the highest value of electroactive polymer variable capacitance Ce. As the circuit operates (described below), the voltage in Cb will typically increase beyond the battery or low voltage, but diode 56 prevents flow back into the battery or other low voltage source. Indeed, after the initial charging, in many cases the battery or voltage source can be disconnected unless the electroactive polymer 12 generator sits idle or too much energy is drawn off to maintain an initial charge. More typically, if the electroactive polymer is being stretched and contracted continuously a sufficient amount, the voltage on Cb will increase and never fall back to +V during continuous operation. In another specific embodiment, the buffer capacitor includes an electroactive polymer transducer.

In operation, Switch #1 first closes briefly while the electroactive polymer 12 is in a stretched (higher capacitance) state. Charge flows from buffer capacitor Cb to the electroactive polymer 12 represented by the variable capacitance Ce through inductor L. It also flows through load $R_L$ (including inductor resistance) and electroactive polymer electrode series resistance (represented in FIG. 9 by Re). It is possible to also provide a second path, not shown, for charging without going through load RL (though there will still be inductor resistance to consider) by using another diode in parallel with RL and in the forward direction of Switch #1.

Switches #1 and #2 may include any suitable switching technology known to those of skill in the art, such as a mechanical switch or a semiconductor switch. In some embodiments, each switch include a mechanical switch that is mechanically closed by motion of the electroactive polymer transducer 12 or by the same forces that are stretching and contracting the transducer 12. In a specific embodiment, a circuit as described herein includes a mechanical switch that is configured to regulate current flow to or from the electroactive polymer transducer according to a deflection state of the electroactive polymer transducer. The switches may also include a combination semiconductor and mechanical switches where, for example, the mechanical switch connects an IGBT or MOSFET gate in series with a large resistance and suitable electrical arrangement, so that very little power or energy flows through the mechanical switch itself, but the semiconductor switch is then closed and allows large amounts of energy to flow. Mechanical switches are sometimes convenient because they can be used at either end of the electroactive polymer device stroke, thus eliminating the need for more complicated sensing or timing of the switching.

When switch #1 is closed and charge flows to Ce, inductor L becomes energized by the current flow and provides efficient charge transfer between Cb and Ce. Switch #1 is then opened, and the electroactive polymer is allowed to contract. This reduces the capacitance Ce, but since both Switch #1 and Switch #2 are open, charge is constant on the electroactive polymer transducer 12 during contraction. Since in general V=Q/C where Q is the charge and C is the capacitance, if Q is fixed on the variable capacitance Ce, and Ce decreases (EPAM contracts), the voltage on the transducer 12 increases. Since the electrical energy on the EPAM is roughly $E=0.5Q^2/Ce$, as Ce decreases and Q stays fixed, the electrical energy on the transducer 12 increases during contraction. Hence electrical energy has been generated by contraction, and more energy is on Ce than was initially deposited there during charging in the stretched state.

Once the electroactive polymer is sufficiently contracted, Switch #2 is closed. This allows energy to flow back from the EPAM to the buffer capacitor Cb. Since Ce was initially charged from Cb, and the voltage on Ce has increased, the voltage is in the proper direction to cause charge to flow into Cb through inductor L and load RL. The current flow through L causes L to be magnetically energized, and energy is efficiently transferred back from Ce to Cb. When RL (and Re) are sufficiently low resistance, and the switches and diodes sufficiently efficient, then more energy is transferred back to Cb than was initially taken from Cb during charging of Ce in the stretched state. Hence the energy of Cb was increased, and its voltage also increased. The additional charge is pulled up from ground by inductor L through the diode 58 connected to ground.

Switch #2 is then opened and the cycle can be repeated. The charge and voltage on both Cb and Ce will continue to increase until losses become equal to energy gain (for example, with some loads, resistance RL will increase for higher voltage and currents driven through it), or energy is pulled out of the system by means not shown (one could periodically take some energy out of Cb for electrical energy storage, usage in a load 18, or to keep voltage within bounds, for example).

As mentioned above, energy withdrawal from the transducer 12 continuously, or in discrete steps or packets depending on the degree and type of switching control. Large packets may saturate the inductor L. Saturation of the core of the inductor is not in itself bad, but if saturation leads to electrical or magnetic losses then it can be detrimental. If saturation is expected for the generator, then ideally the inductor is chosen to have low losses under saturation conditions. If the entire energy stored on Ce is to be transferred in on one switching of switch #2, then the inductance of L is selected relative to Ce. In one embodiment, L is between about 1 mH and about 1 H. In a more specific embodiment, L is between about 50 mH and about 200 mH.

Still referring to FIG. 9, it is sometimes desirable to take power from the circuit continuously, rather than intermittently as described above. In such a case, L may be connected directly to Cb, and the load, RL, may be connected in parallel with Cb.

Circuit 16L typically works well when parasitic and load losses are lower than the energy gain per cycle. In one embodiment, Cemax and Cb are selected such that:

$$Ce_{max} < Cb,$$

where $Ce_{max}$ is the maximum capacitance of the electroactive polymer transducer 12.

In one embodiment, each parameter in $(R_L+Re)$ $Ce_{min}$ is each selected such that the resistance-capacitance time constant is the smallest of the time constants in circuit 16e. This implies that the electrodes are able to deliver the energy from the transducer 12 faster than any other delay in the circuit. This can be expressed as follows:

$$(R_L+Re)Ce_{min} < \{LCe_{min} \text{time constant}\} < (L/(R_L+Re))$$

where $Ce_{min}$ is the minimum capacitance of the electroactive polymer, $\{LCe_{max}$ time constant$\}$ is the inductor-capacitance time constant using $Ce_{max}$ and inductor L; for this case it is roughly $3.14 \, (LCe_{min})^{0.5}$, $(L/(R_L+Re))$ can be thought of as the series inductor-resistance time constant, and $(R_L+Re) \, Ce_{min}$ is the resistance-capacitance time constant for discharging the electroactive polymer transducer 12.

In another embodiment, each parameter in $(L/(R_L+Re))$ is selected to produce a high value. The series inductor-resistance time constant is a measure of how long a time can be tolerated before resistive losses become comparable to the magnetic stored energy in the inductor. Roughly speaking, if the energy on Ce is transferred to Cb in one switching of switch #2, then the time for the transfer will be roughly $\{LCe_{max}$ time constant$\}$, which can be approximated by $3.14 \, (LCe_{min})^{0.5}$. Hence, if $(L/(R_L+Re))$ is much smaller than the time for transfer, then resistive losses will be small compared to the magnetic energy in the inductor and hence small compared to the transferred energy. In this case the circuit 16L can be efficient.

In addition, the switching change of state (i.e. the time to go from "on" to "off" or vice versa) should be done in a time that is short compared to $\{LCe_{max}$ time constant$\}$. This will minimize losses because then the time that the switch is in a partial state (neither "on" nor "off") when switches are typically lossy will be minimal. Choosing design parameters as outlined above even permits relatively slow mechanical switches to be efficient.

As mentioned in the background, compliant electroactive polymers electrically behave very differently than their rigid predecessors. Compliant electrodes include far greater electrical resistances than metal electrodes. It is generally easy to obtain suitable RC time constants in traditional rigid piezoelectric circuits. And the electrode compliance cannot be sacrificed to reduce the RC time constant in an electroactive polymer generator circuit. Circuit 16L overcomes these issues and permits a large R suitable for use with an electroactive polymer transducer 12.

Figure 10A:
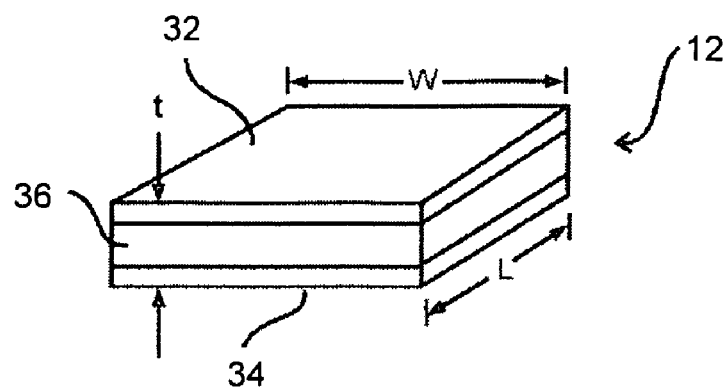
FIGS. 10A and 10B illustrate an electroactive polymer transducer portion.
Figure 10B:
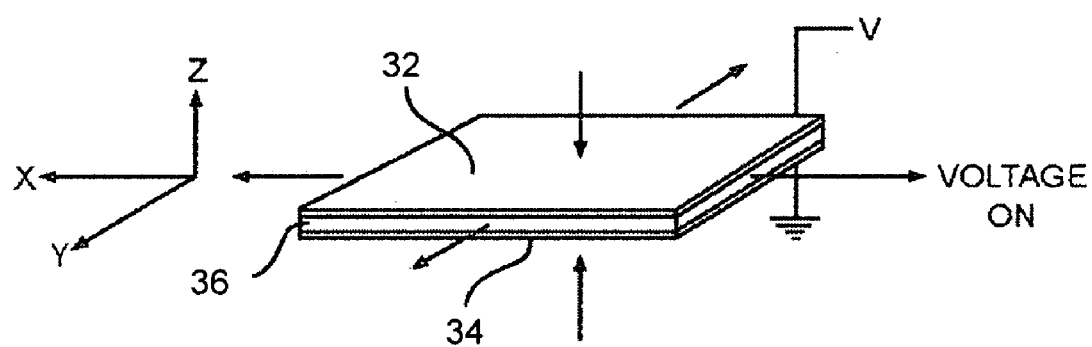

Having discussed generator circuits suitable for use with an electroactive polymer transducer, various electroactive polymer transducers suitable for use with the present invention will now be described. FIGS. 10A and 10B will now be used to expand upon compliant electroactive polymers and their behavior. FIG. 10B shows an electroactive polymer transducer 12 portion in a stretched state while FIG. 10A shows the transducer 12 portion in a contracted state.

A portion of thin elastomeric polymer 36, also commonly referred to as a film or membrane, is sandwiched between compliant electrodes 32 and 34. In this elastomeric polymer transducer, the elastic modulus of the electrodes is generally less than that of the polymer, and the length "L" and width "W" of the film are much greater than the thickness "t".

In actuation mode, as seen in conversion from FIG. 10A to FIG. 10B, when a voltage is applied across the electrodes, the unlike charges in the two electrodes 34, 32 are attracted to each other and these electrostatic attractive forces compress the polymer film 36 (along the Z-axis). The repulsive forces between like charges in each electrode tend to stretch the film in the plane (along the X and Y-axes). As transducer 12 changes in size, the deflection may be used to produce mechanical work.

$$s = \varepsilon_r \varepsilon_0 E^2 = \frac{\varepsilon_r \varepsilon_0 v^2}{t^2} \quad \text{(Equation 1)}$$

Electroactive polymers may convert between electrical energy and mechanical energy in a bi-directional manner. Thus, transducer usage as a generator to convert mechanical energy to electrical energy will now be described.

FIGS. 10A and 10B may be used to show one manner in which the transducer portion 12 converts mechanical energy to electrical energy. For example, when the transducer portion 12 is mechanically stretched by external forces to a thinner, larger area shape such as that shown in FIG. 10B, and a relatively small voltage difference (less than that necessary to actuate the film to the larger area of FIG. 10B) is applied between electrodes 34 and 32, the transducer portion 12 will contract in area to a shape such as in FIG. 10A when the external forces are removed. Stretching the transducer refers to deflecting the transducer from its original resting position or another smaller size—typically to result in a larger net area defined by the L and W dimensions in FIG. 10A. The resting position refers to the position of the transducer portion 12 having no external electrical or mechanical input and may comprise any pre-strain in the polymer. Once the transducer portion 12 is stretched, the relatively small voltage difference is provided such that the resulting electrostatic forces are insufficient to balance the elastic restoring forces of the stretch. The transducer portion 12 therefore contracts when stretching forces are released, and it becomes thicker and has a smaller planar area (orthogonal to the thickness between electrodes). When polymer 36 becomes thicker, it separates electrodes 34 and 32 and their corresponding unlike charges, thus raising the electrical energy and voltage of the charge. Further, when electrodes 34 and 32 contract to a smaller area, like charges within each electrode compress, also raising the electrical energy and voltage of the charge. Thus, with different charges on electrodes 34 and 32, contraction from a shape such as that shown in FIG. 10B to one such as that shown in FIG. 10A raises the electrical energy of the charge. That is, mechanical deflection is being turned into electrical energy and the transducer portion 12 is acting as a generator.

For a transducer having a substantially constant thickness, one mechanism for differentiating the performance of the transducer, or a portion of the transducer associated with a single active area, as performing in actuator or generator mode, is in the change in net area orthogonal to the thickness associated with the polymer deflection. For these transducers, or active areas, when the deflection causes the net area of the transducer/active area to decrease and there is charge on the electrodes, the transducer/active area is converting from mechanical to electrical energy and acting as a generator. Conversely, when the deflection causes the net area of the transducer/active area to increase and charge is on the electrodes, the transducer/active area is converting electrical to mechanical energy and acting as an actuator. The change in area in both cases corresponds to a reverse change in film thickness, i.e. the thickness contracts when the planar area expands, and the thickness expands when the planar area contracts. Both the change in area and change in thickness determine the amount of energy that is converted between electrical and mechanical. Since the effects due to a change in area and corresponding change in thickness are typically complementary, only the change in area is discussed herein for sake of brevity. In addition, although deflection of an electroactive polymer is primarily discussed herein as a net increase in area of the polymer when the polymer is being used in an actuator to produce mechanical energy, it is understood that in some cases (i.e. depending on the loading), the net area may decrease to produce mechanical work.

Generally speaking, deflection of a transducer 12 portion refers to any displacement, expansion, contraction, torsion, linear or area strain, or any other deformation of a portion of the transducer. For actuation, transducer 12 continues to deflect until mechanical forces balance the electrostatic forces driving the deflection. The mechanical forces include elastic restoring forces of the polymer 36 material, the compliance of the electrodes 34 and 32, and any external resistance provided by a device and/or load coupled to the transducer 12. The resultant deflection of the transducer 12 as a result of the applied voltage may also depend on a number of other factors such as the polymer 36 dielectric constant and the polymer 36 size and stiffness.

In some cases, electrodes 34 and 32 cover a limited portion of a polymer relative to the total area of the polymer. When the active area is used to convert electrical energy to mechanical energy, the active area includes a portion of polymer 102 having sufficient electrostatic force to enable deflection of the portion. When the active area is used to convert mechanical energy to electrical energy, the active area includes a portion of polymer 102 having sufficient deflection to enable a change in electrostatic energy. Polymer 36 can be held using, for example, a rigid frame (not shown) attached at the edges of polymer 36.

Polymer 36 material outside an active area may act as an external spring force on the active area during deflection. More specifically, material outside active area may resist active area deflection by its contraction or expansion. Removal of the voltage difference and the induced charge causes the reverse effects. Active areas for monolithic polymers and transducers of the present invention may be flexibly arranged. Further description of monolithic transducers suitable for use with the present invention is further available in U.S. Pat. No. 6,664,718, which is incorporated by reference herein for all purposes.

Polymer 36 has a variable capacitance with deflection. In one embodiment, polymer 36 is selected to have a capacitance between about 10 nanofarads (nF) and about 1 Farads. A large generator or one that uses thinner polymers may use larger capacitances. In a specific embodiment, polymer 36 is selected to have a capacitance between about 100 nF and about 400 nF. Polymer 36 also operates at high voltages.

Suitable actuation voltages for electroactive polymers, or portions thereof, may vary based on the material properties of the electroactive polymer, such as the dielectric constant, as well as the dimensions of the polymer, such as the thickness of the polymer film. For example, actuation electric fields used to actuate polymer 12 in FIG. 11A may range in magnitude from about 0 V/m to about 440 MV/m. Actuation electric fields in this range may produce a pressure in the range of about 0 Pa to about 10 MPa. In order for the transducer to produce greater forces, the thickness of the polymer layer may be increased. Actuation voltages for a particular polymer may be reduced by increasing the dielectric constant, decreasing the polymer thickness, and decreasing the modulus of elasticity, for example.

Polymer materials may be selected based on one or more material properties or performance characteristics, including but not limited to a low modulus of elasticity, a high dielectric constant, strain, energy density, actuation pressure, specific elastic energy density, electromechanical efficiency, response time, operational frequency, resistance to electrical breakdown and adverse environmental effects, etc. Polymers having dielectric constants between about 2 and about 20, and particularly between about 2.5 and about 36, are also suitable. Specific elastic energy density—defined as the energy of deformation of a unit mass of the material in the transition between actuated and unactuated states—may also be used to describe an electroactive polymer where weight is important.

Linear strain and area strain may be used to describe deflection of compliant polymers used herein. As the term is used herein, linear strain refers to the deflection per unit length along a line of deflection relative to the unactuated state. Maximum linear strains (tensile or compressive) of at least about 25 percent are common for polymers of the present invention. Maximum linear strains (tensile or compressive) of at least about 50 percent are common. Of course, a polymer may deflect with a strain less than the maximum and the strain may be adjusted by adjusting the applied voltage. For some polymers, maximum linear strains in the range of about 40 to about 215 percent are common, and are more commonly at least about 120 percent. Area strain of an electroactive polymer refers to the change in planar area, e.g., the change in the plane defined by the X and Y-axes in FIG. 1B, per unit area of the polymer upon actuation relative to the unactuated state. Maximum area strains of at least about 120 percent are possible. For some polymers (at low frequencies), maximum area strains in the range of about 70 to about 330 percent are possible.

There many commercially available polymer materials that may be used for polymer 36 including but not limited to: acrylic elastomer, silicone elastomer, polyurethane, PVDF copolymer and adhesive elastomer. In one embodiment, the polymer is an acrylic elastomer comprising mixtures of aliphatic acrylate that are photocured during fabrication. The elasticity of the acrylic elastomer results from a combination of the branched aliphatic groups and cross-linking between the acrylic polymer chains. One suitable material is NuSil CF19-2186 as provided by NuSil Technology of Carpenteria, Calif. Other exemplary materials suitable for use as polymer 36 include any dielectric elastomeric polymer, silicone rubbers, fluoroelastomers, silicones such as Dow Corning HS3 as provided by Dow Corning of Wilmington, Del., fluorosilicones such as Dow Corning 730 as provided by Dow Corning of Wilmington, Del., etc, and acrylic polymers such as any acrylic in the 4900 VHB acrylic series as provided by 3M Corp. of St. Paul, Minn. Other suitable polymers may include one or more of: silicone, acrylic, polyurethane, fluorosilicone, fluoroelastomer, natural rubber, polybutadiene, nitrile rubber, isoprene, SBS, and ethylene propylene diene.

Polymer 36 may also include one or more additives to improve various properties or parameters related to the ability of the polymer to convert between mechanical energy and electrical energy. Such material properties and parameters include but are not limited to the dielectric breakdown strength, maximum strain, dielectric constant, elastic modulus, properties associated with the viscoelastic performance, properties associated with creep, response time and actuation voltage. Examples of classes of materials which may be used as additives include but are not limited to plasticizers, antioxidants, and high dielectric constant particulates.

The addition of a plasticizer may, for example, improve the functioning of a transducer by reducing the elastic modulus of the polymer and/or increasing the dielectric breakdown strength of the polymer. Examples of suitable plasticizers include high molecular-weight hydrocarbon oils, high molecular-weight hydrocarbon greases, Pentalyne H, Piccovar® AP Hydrocarbon Resins, Admex 760, Plastolein 9720, silicone oils, silicone greases, Floral 125, silicone elastomers, nonionic surfactants, and the like. Of course, combinations of these materials may be used. Alternatively, a synthetic resin may be added to a styrene-butadiene-styrene block copolymer to improve the dielectric breakdown strength of the copolymer. For example, pentalyn-H as produced by Hercules, Inc. of Wilmington, Del. was added to Kraton D2124 as produced by Shell Chemical of Houston, Tex. to improve the dialectic breakdown strength of the Kraton D2124. Certain types of additives may be used to increase the dielectric constant of a polymer. For example, high dielectric constant particulates such as fine ceramic powders may be added to increase the dielectric constant of a commercially available polymer. Alternatively, polymers such as polyurethane may be partially fluorinated to increase the dielectric constant.

Polymer 36 may be prestrained to improve conversion between electrical and mechanical energy. The pre-strain improves the mechanical response of an electroactive polymer relative to a non-strained electroactive polymer. The improved mechanical response, e.g., larger deflections, faster response times, and higher actuation pressures, enables greater mechanical work.

The prestrain may comprise elastic deformation of the polymer and be formed, for example, by stretching the polymer in tension and fixing one or more of the edges to a frame while stretched or may be implemented locally for a portion of the polymer. Linear strains of at least about 200 percent and area strains of at least about 300 percent are possible with pre-strained polymers of the present invention. The pre-strain may vary in different directions of a polymer. Combining directional variability of the prestrain, different ways to constrain a polymer, scalability of electroactive polymers to both micro and macro levels, and different polymer orientations (e.g., rolling or stacking individual polymer layers) permits a broad range of actuators that convert electrical energy into mechanical work.

The desired performance of an electroactive polymer transducer may be controlled by the extent of prestrain applied to the polymer film and the type of polymer material used. For some polymers of the present invention, pre-strain in one or more directions may range from about −120 percent to about 600 percent. The pre-strain may be applied uniformly across the entire area of the polymer film or may be unequally applied in different directions. In one embodiment, pre-strain is applied uniformly over a portion of the polymer 36 to produce an isotropic pre-strained polymer. By way of example, an acrylic elastomeric polymer may be stretched by about 200 to about 400 percent in both planar directions. In another embodiment, pre-strain is applied unequally in different directions for a portion of the polymer 36 to produce an anisotropic pre-strained polymer. In this case, the polymer 36 may deflect more in one direction than another when actuated. By way of example, for a VHB acrylic elastomer having isotropic pre-strain, pre-strains of at least about 120 percent, and preferably between about 200 to about 400 percent, may be used in each direction. In one embodiment, the polymer is pre-strained by a factor in the range of about 1.5 times to about 50 times the original area. In some cases, pre-strain may be added in one direction such that a negative pre-strain occurs in another direction, e.g., 600 percent in one direction coupled with −120 percent in an orthogonal direction. In these cases, the net change in area due to the pre-strain is typically positive.

Polymers of the present invention may cover a wide range of thicknesses. In one embodiment, polymer thickness may range between about 1 micrometer and about 2 millimeters. For example, typical thicknesses before pre-strain range from about 50 to about 225 micrometers for HS3, about 25 to about 75 micrometers for NuSil CF 19-2186, and about 120 to about 1200 micrometers for any of the 3M VHB 4900 series acrylic polymers. Polymer thickness may be reduced by stretching the film in one or both planar directions. In many cases, pre-strained polymers of the present invention may be fabricated and implemented as thin films. Thicknesses suitable for these thin films may be below 20 micrometers.

Electrodes suitable for use with the present invention may be of any shape and material provided they are able to supply and/or receive a suitable voltage, either constant or varying over time, to or from an electroactive polymer. In one embodiment, the electrodes adhere to a surface of the polymer. Electrodes adhering to the polymer are typically compliant and conform to the changing shape of the polymer. The electrodes may be only applied to a portion of an electroactive polymer and define an active area according to their geometry.

In one embodiment, compliant electrodes of the present invention comprise a conductive grease such as carbon grease or silver grease. The conductive grease provides compliance in multiple directions. Particles may be added to increase the conductivity of the polymer. By way of example, carbon particles may be combined with a polymer binder such as silicone to produce carbon grease that has low elasticity and high conductivity. Other materials may be blended into the conductive grease to alter one or more material properties. In a specific embodiment, an electrode suitable for use with the present invention comprises 80 percent carbon grease and 20 percent carbon black in a silicone rubber binder such as Stockwell RTV60-CON as produced by Stockwell Rubber Co. Inc. of Philadelphia, Pa. The carbon grease is of the type such as NyoGel 756G as provided by Nye Lubricant Inc. of Fairhaven, Mass. The conductive grease may also be mixed with an elastomer, such as silicon elastomer RTV 118 as produced by General Electric of Waterford, N.Y., to provide a gel-like conductive grease.

Compliant electrodes may also include colloidal suspensions. Colloidal suspensions contain submicrometer sized particles, such as graphite, silver and gold, in a liquid or elastomeric vehicle. Generally speaking, any colloidal suspension having sufficient loading of conductive particles may be used as an electrode in accordance with the present invention. In a specific embodiment, conductive grease including colloidal sized conductive particles is mixed with a conductive silicone including colloidal sized conductive particles in a silicone binder to produce a colloidal suspension that cures to form a conductive semi-solid. An advantage of colloidal suspensions is that they may be patterned on the surface of a polymer by spraying, dip coating and other techniques that allow for a thin uniform coating of a liquid. To facilitate adhesion between the polymer and an electrode, a binder may be added to the electrode. By way of example, a water-based latex rubber or silicone may be added as a binder to a colloidal suspension including graphite.

In another embodiment, mixtures of ionically conductive materials may be used for the compliant electrodes. This may include, for example, water based polymer materials such as glycerol or salt in gelatin, iodine-doped natural rubbers and water-based emulsions to which organic salts such as potassium iodide are added. For hydrophobic electroactive polymers that may not adhere well to a water based electrode, the surface of the polymer may be pretreated by plasma etching or with a fine powder such as graphite or carbon black to increase adherence.

In some cases, a transducer of the present invention may implement two different types of electrodes. By way of example, a transducer may have a grease attached to its top surface and a high aspect ratio carbon material deposited on the bottom side.

Generally speaking, desirable properties of the compliant electrodes may include: a low modulus of elasticity, low mechanical damping, a low surface resistivity, uniform resistivity, low resistivity, chemical and environmental stability, chemical compatibility with the electroactive polymer, good adherence to the electroactive polymer, and an ability to form smooth surfaces. In one embodiment, the compliant electrodes include a resistivity greater than 1 ohm-cm. In a specific embodiment, the compliant electrodes include a resistivity greater than 100 ohm-cm. In practice, resistivity in ohm-cm divided by electrode thickness provides a more distinctive measure for compliant electrodes, or the surface resistance. In one embodiment, the compliant electrodes include a surface resistance from about 10 ohms per square to about 100 Mega-ohms per square. In a specific embodiment, the compliant electrodes include a surface resistance from about 100 ohms per square to about 10000 ohms per square. These ranges are notably much larger than the resistivities associated with low deflection and much less compliant metal electrodes used in older piezoelectric devices.

It is understood that certain electrode materials may work well with particular polymers and may not work as well for others. By way of example, carbon fibrils work well with acrylic elastomer polymers while not as well with silicone polymers.

Figure 11:
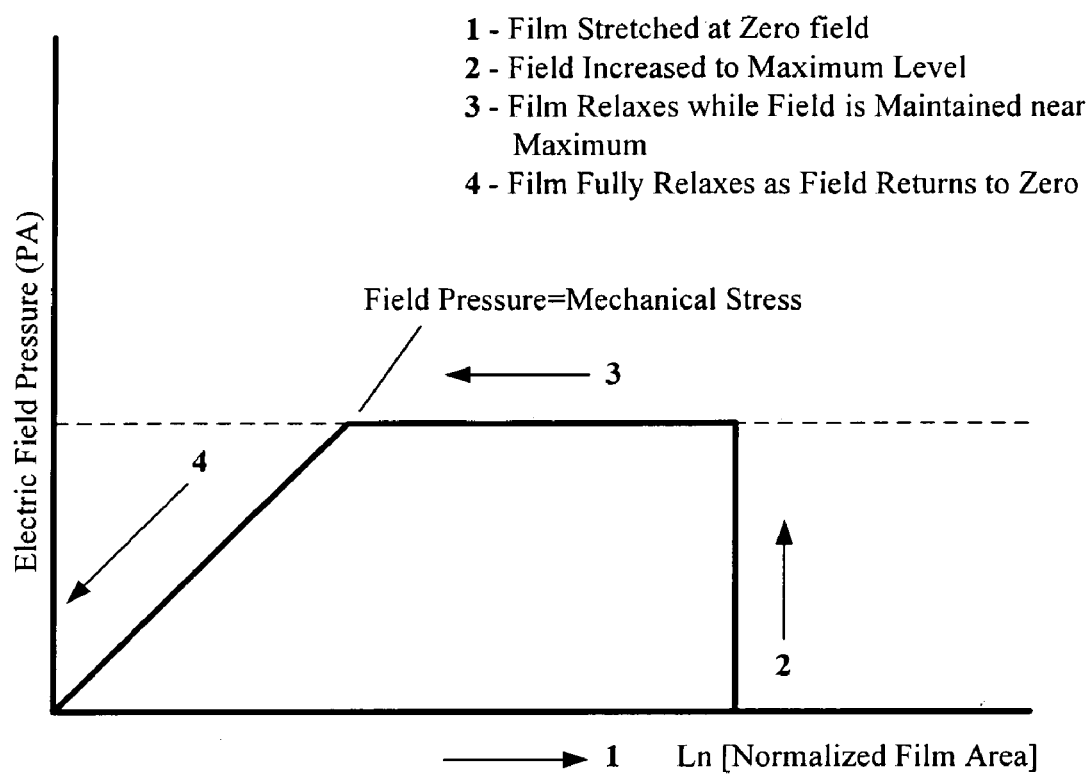
FIG. 11 illustrates a method and cycle for harvesting energy from a generator employing an electroactive polymer transducer.

FIG. 11 illustrates a method and cycle for harvesting energy from a generator employing an electroactive polymer for one embodiment of the present invention. A mechanical energy source is used to produce electricity using a generator including an electroactive polymer and circuit as described above. In general, the energy source is used to deflect or stretch the electroactive polymer transducer in some manner. To generate electrical energy over an extended time period, the polymer film may be stretched and relaxed over many cycles.

In FIG. 11, one sample method and cycle of a polymer film stretching and relaxing to convert mechanical energy to electrical energy is shown. Other methods and cycles are suitable for use with circuits described herein. In 1, the electroactive polymer transducer is stretched with zero or minimal electric field pressure on the polymer. The stretching results from a mechanical force applied to the film generated from an external energy source. In 2, the electric field pressure on the polymer film is increased to some higher or maximum value. In this example, the maximum value of the electric field pressure is just below the breakdown strength of the polymer, allowing for changes in the environment, lifetime, and the polymer which may change the breakdown strength of the polymer. In 3, the polymer relaxes while the electric field pressure is maintained near its maximum value. As the polymer relaxes, the voltage of the charge on the polymer film is increased. The increase in charge's electrical energy, as indicated by its higher voltage, on the polymer film is harvested to generated electrical energy. In 4, the polymer film fully relaxes as the electric field pressure is reduced to zero or some other minimal value and the cycle may be repeated.

Transducers using an electroactive polymer transducer film that are cycled in a manner such as described with reference to FIG. 11, may have electrical energy added to the transducer at certain times in the cycle and may have electrical energy removed from the transducer in other portions of the cycle. In general, generators of the present invention that employ transducers are designed such that the total electrical energy added to the transducer is less than the total electrical energy removed from the transducer during a cycle of some type.

Circuits and methods as described herein can be used in a wide variety of larger systems, devices, apparatus, and applications. For example, the power circuit can be used in a buoy with a light powered by wave motion, transducer 12 and circuit 16. In such an embodiment, the waves of the ocean provide mechanical energy for source 14 and the rechargeable batter 30 can be used to significantly extend the life of the battery used to power the remote light. Other embodiments include heel-strike and other portable generators, combustion engine generators (to generate electrical power from the mechanical power of the combustion engine), electric motors and wind power generators for example.

While this invention has been described in terms of several preferred embodiments, there are alterations, permutations, and equivalents that fall within the scope of this invention which have been omitted for brevity's sake. It is understood that the fuel cells need not include one or more heat transfer appendages to benefit from heating transfer techniques described herein. It is therefore intended that the scope of the invention should be determined with reference to the appended claims.

What is claimed is:

1. A electroactive polymer transducer including an electroactive polymer, a first electrode in electrical communication with a first surface portion of the electroactive polymer and a second electrode in electrical communication with a second surface portion of the electroactive polymer, wherein the electroactive polymer transducer has a capacitance that varies with deflection of the electroactive polymer; and a generator circuit including a capacitor and electrically coupled to the electroactive polymer transducer, wherein the generator circuit is configured such that the capacitor collects electrical energy from the electroactive polymer transducer in response to a change in capacitance of the electroactive polymer, and wherein the generator circuit further includes a plurality of switches configured to regulate charging and discharging of the electroactive polymer transducer according to a deflection state of the electroactive polymer transducer.

2. The generator of claim 1 wherein the generator circuit further comprises a charge pump circuit, the charge pump circuit and the electroactive polymer transducer cooperating to generate a first voltage.

3. The generator of claim 2 wherein the generator circuit further comprises a step-down circuit coupled to receive the first voltage and adapted to reduce the first voltage to a second voltage, wherein the second voltage is less than the first voltage.

4. The generator of claim 3 wherein the step-down circuit further comprises a plurality of step-down stages, each of the plurality of stages including a step-down capacitor configured to store charge in response to the first voltage.

5. The generator of claim 3 wherein the step-down circuit further comprises a plurality of step-down stages, wherein a fixed voltage drop occurs across each step-down stage respectively.

6. The generator of claim 3 further including a second charge pump circuit configured to maintain the first voltage provided to the step-down circuit when the capacitance of the electroactive polymer transducer decreases.

7. The generator of claim 2 wherein the charge pump circuit is configured to set a bias voltage to generate the first voltage.

8. The generator of claim 1 further including rechargeable battery coupled to the output of the generator circuit.

9. The apparatus of claim 1 further comprising a voltage protection circuit configured to limit the maximum voltage of the electroactive polymer transducer.

10. The generator of claim 1 wherein the generator circuit does not include an inductor.

11. The generator of claim 1 wherein the generator circuit includes an inductor.

12. The generator of claim 11 wherein an RC time constant of the i) first and second electrode resistance, ii) inductor resistance, and iii) electroactive polymer capacitance is less than a series inductor-resistance time constant of a) the inductor inductance, b) the first and second electrode resistance and c) the inductor resistance.

13. The generator of claim 12 wherein the RC time constant is less than an LC time constant of an inductor-capacitance time constant of the inductor and the first and second electrode resistance and the inductor resistance.

14. The generator of claim 13 wherein the LC time constant is less than the inductor-capacitance time constant.

15. The generator of claim 11 wherein the circuit further includes a buffer capacitor with a greater capacitance than a maximum capacitance of the electroactive polymer.

16. The generator of claim 1 wherein the electroactive polymer includes a capacitance between about 10 nf and about 10000 nf.

17. The generator of claim 1 wherein the first and second electrode include a surface resistance from about 10 ohms per square to about 100 Mega-ohms per square.

18. The generator of claim 1 wherein the plurality of switches includes a first switch adapted to facilitate charging the electroactive polymer transducer when the first switch is closed and the electroactive polymer transducer is in a stretched state.

19. The generator of claim 18 wherein the plurality of switches further includes a second switch adapted to facilitate discharging the electroactive polymer transducer when the second switch is closed and the electroactive polymer transducer is in a contracted state.

20. A generator comprising:
- an electroactive polymer transducer including an electroactive polymer, a first electrode in electrical communication with a first surface portion of the electroactive polymer and a second electrode in electrical communication with a second surface portion of the electroactive polymer, wherein the electroactive polymer transducer has a capacitance that varies with deflection of the electroactive polymer;
- a generator circuit including a capacitor and electrically coupled to the electroactive polymer transducer, wherein the generator circuit is configured such that the capacitor collects electrical energy from the electroactive polymer transducer in response to a change in capacitance of the electroactive polymer;
- a rechargeable battery coupled to the output of the generator circuit;
- a load;
- a primary battery; and
- a power output control circuit configured to provide either the power stored in the rechargeable battery or power stored in the primary battery to the load.

21. An apparatus comprising:
- an electroactive polymer transducer including an electroactive polymer, a first electrode in electrical communication with a first surface portion of the electroactive polymer and a second electrode in electrical communication with a second surface portion of the electroactive polymer, wherein the transducer has a capacitance that varies with deflection of the electroactive polymer;
- a generator circuit including a capacitor and electrically coupled to the electroactive polymer transducer, wherein the generator circuit is configured such that the capacitor collects electrical energy from the electroactive polymer transducer in response to a change in capacitance of the electroactive polymer, and wherein the generator circuit further includes a plurality of switches configured to regulate charging and discharging of the electroactive polymer transducer according to a deflection state of the electroactive polymer transducer; and
- one or more transmission mechanisms that are designed or configured to receive mechanical energy and to transfer a portion of mechanical energy to the electroactive polymer transducer, wherein the transferred portion of the mechanical energy results in a deflection in a portion of the electroactive polymer transducer.

22. The generator of claim 21 wherein the generator circuit further comprises a) a charge pump circuit, the charge pump circuit and the electroactive polymer transducer cooperating to generate a first voltage; and b) a step-down circuit coupled to receive the first voltage and adapted to reduce the first voltage to a second voltage, wherein the second voltage is less than the first voltage.

23. The generator of claim 21 wherein the generator circuit includes an inductor and wherein an RC time constant of the i) first and second electrode resistance, ii) inductor resistance, and iii) electroactive polymer capacitance is less than a series inductor-resistance time constant of a) the inductor inductance, b) the first and second electrode resistance and c) the inductor resistance.

24. The generator of claim 21 wherein the first and second electrode include a surface resistance from about 10 ohms per square to about 100 Mega-ohms per square.

25. A method of converting mechanical energy to electrical energy using an electroactive polymer transducer that includes an electroactive polymer and two electrodes, the method comprising:
- mechanically deflecting a portion of the electroactive polymer such that the portion has a larger area between the two electrodes than an area for the portion between the two electrodes before the deflection;
- applying a voltage difference between the two electrodes, wherein the voltage difference is not large enough to cause the portion to mechanically deflect from the larger area;
- mechanically contracting the electroactive polymer transducer to have a smaller area between the electrodes than the larger area between the electrodes when the voltage difference was applied;
- regulating the charging and discharging of the electroactive polymer transducer according to a deflection state of the electroactive polymer transducer using a plurality of switches; and
- removing electrical energy from the electroactive polymer transducer using a generator circuit that includes a capacitor.

26. The method of claim 25 further comprising a) generating a first voltage using a charge pump circuit and the electroactive polymer transducer; and b) reduce the first voltage to a second voltage, wherein the second voltage is less than the first voltage.

27. The method of claim 25 wherein the generator circuit includes an inductor and wherein an RC time constant of the i) first and second electrode resistance, ii) inductor resistance, and iii) electroactive polymer capacitance is less than a series inductor-resistance time constant of a) the inductor inductance, b) the first and second electrode resistance and c) the inductor resistance.

28. The method of claim 25 wherein the two electrodes include a surface resistance from about 10 ohms per square to about 100 Mega-ohms per square.

\* \* \* \* \*